United States Patent [19]

Kahle

[11] Patent Number: 4,631,858

[45] Date of Patent: Dec. 30, 1986

[54] BUG CATCHER

[76] Inventor: Norman R. Kahle, W. 5150 Bruno Dr., Tomahawk, Wis. 54487

[21] Appl. No.: 763,638

[22] Filed: Aug. 8, 1985

[51] Int. Cl.⁴ .............................................. A01M 5/02
[52] U.S. Cl. ..................................................... 43/134
[58] Field of Search .................... 43/4, 134, 135, 137, 43/139

[56] References Cited

U.S. PATENT DOCUMENTS

| | | | |
|---|---|---|---|
| 454,720 | 6/1891 | Dexter | 43/139 |
| 1,329,534 | 2/1920 | McGrath | 43/135 |
| 1,797,557 | 3/1931 | Stine et al. | 43/139 |
| 3,184,878 | 5/1965 | Senne | 43/4 |
| 3,231,997 | 2/1966 | Shugarman | 43/134 |
| 3,486,264 | 12/1969 | Mounier et al. | 43/4 |
| 3,711,987 | 1/1973 | Fisk | 43/134 |

Primary Examiner—M. Jordan
Attorney, Agent, or Firm—Paul H. Gallagher

[57] ABSTRACT

A tube having an open front end and a piston therein. The piston is moved manually to a forward cocked position adjacent the open end of the tube, against the action of a tension spring. A closure flapper is hinged in the tube adjacent the open end of the tube, spring biased to closed position. In operation, the open end of the tube is held near the insect, with the piston in cocked position, and the piston is then released, which is thereupon drawn back by the tension springs. This movement of the piston produces a vacuum in the tube, this action opening the closure flapper, and drawing in the insect, after which the closure flapper is moved to closed position by the spring.

3 Claims, 6 Drawing Figures

U.S. Patent  Dec. 30, 1986  4,631,858
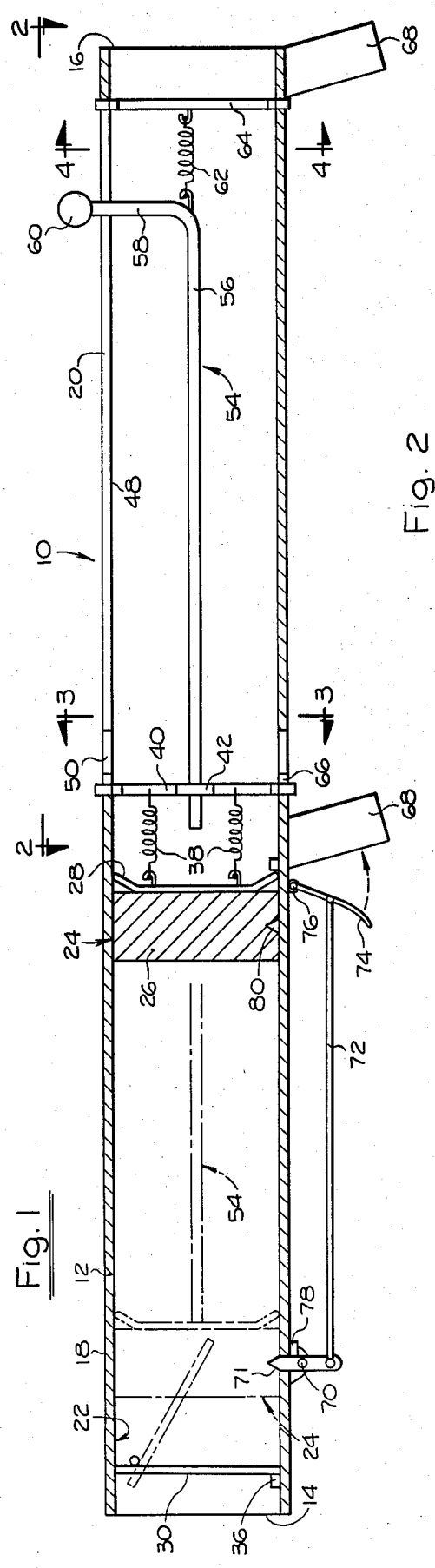
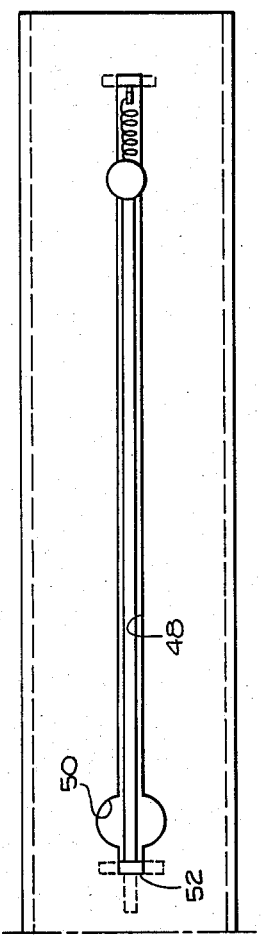
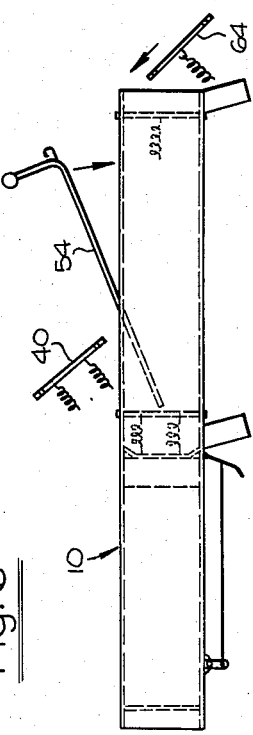
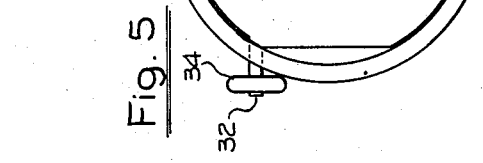
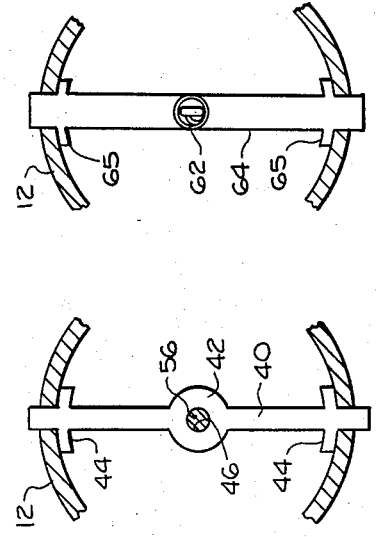

BUG CATCHER

OBJECTS OF THE INVENTION

A broad object of the invention is to provide a device for catching insects, such as bugs, flies, ants, and similar small insects.

Another object is to provide such a device that is effective for lifting the insects and drawing them into the device, alive, the device serving as a trap, thereby eliminating killing the insects as by swatting them and the consequent smearing effect.

A further object is to provide such a device that is simple in construction and simple and effective in its operation.

DESCRIPTION OF A PREFERRED EMBODIMENT

In the drawings,

FIG. 1 is a longitudinal sectional view of the bug catcher of the invention.

FIG. 2 is a top view of the rear portion of the device of FIG. 1, taken at line 2—2 of FIG. 1.

FIG. 3 is a sectional view taken at line 3—3 of FIG. 1.

FIG. 4 is a sectional view taken at line 4—4 of FIG. 1.

FIG. 5 is an end view taken from the left of FIG. 1.

FIG. 6 is a side elevational view indicating steps of assembling the parts of the device.

Referring in detail to the drawings, the device as a whole is indicated at 10 and includes a tube 12 which may be of any suitable material, such as plastic, metal, etc. The tube 12 has a front portion 14 and an open front end 16, and a rear portion 18 terminating in a rear end 20. The front portion 14 defines a trap chamber 22 opening through the open front end 16 to the exterior. The device may be of any suitable length, such for example as in the neighborhood of 2 feet. A piston or plunger 24 is slidably mounted in the trap chamber 22, the piston having a body 26 and a gasket 28 sealingly engaging the inner surface of the trap chamber. The piston 24 is slidable between a rear retracted position shown in full lines and an advanced or cocked position shown in dot-dash lines, adjacent the front end. The means for moving the piston will be referred to in detail hereinbelow.

Mounted in the tube, closely adjacent the front end 16, is a flapper 30 in the form of a solid leaf or wafer, pivotally mounted therein on pins 32 secured thereto, and pivotally supported in apertures in the tube. The pins 32 are adjacent the top of the tube, to enable the flapper to provide a relatively great area opening through the front end of the tube, when the flapper is in open position. A coil spring 34 normally moves the flapper to closed position, or down position, shown in full lines in FIG. 1 where a stop element 36 limits its movement to the down closed position. The flapper is movable against the action of the coil spring 34, in the use of the device, in response to the production of a vacuum in the tube, as will be referred to hereinbelow.

The piston is normally held in rear retracted position by front tension springs 38 connected to the piston and to a front rod and guide element 40 detachably mounted in the tube. The rod 40 is of particular shape shown in FIG. 3, being a relatively flat piece, having a central enlargement 42 and a pair of lugs 44 adjacent to but spaced from each end. The enlargement 42 has a central aperture 46.

The tube, on its upper surface, and in the rear portion 18 thereof, has a longitudinal slot 48 with an enlargement 50 adjacent to but spaced from the front end of the slot, leaving a short length 52 of the slot forwardly of the enlargement 50.

A cocking rod 54 is provided, having a long segment 56 and a short segment 58, the latter terminating in a convenient manipulating knob 60. This cocking rod is normally held in rear retracted position, shown in FIG. 1, by a tension spring 62 connected thereto and to a rear bar 64, the latter having lugs 65 adjacent each end. In assembling the parts of the device, the piston 24 may be inserted first, with the springs 38 attached thereto. Then the springs may be extended out through the slot 24 and hooked to the front bar 40, and then the bar 40 inserted through the enlargement 50 of the slot and fitted in place as shown in FIG. 1. In this step, the lower end of the bar 40 is fitted in another slot or hole 66 in the lower side of the tube. The lugs 44 (FIG. 3) at the ends of the bar engage the inner surfaces of the tube and hold the bar in place in diametrical direction, while the springs 38, being connected with the piston, bias the bar 40 forwardly and hold it in place in that direction. A stop 67 limits the rearward movement of the piston. The enlargement 50 of the slot 48 accommodates the enlargement 42 of the bar, in the insertion of the bar into place.

After the foregoing steps, the cocking rod 54 may be inserted in place, as indicated in FIG. 6, where the extended end of the main segment 56 is inserted through the slot 48 and then through the aperture 46. Then the rear end is fitted down through the slot, and the tension spring 62, which may have been previously connected to the rear bar 64, for example, is extended through the slot and hooked on to the cocking bar. The lugs 65 on the rear bar hold the rear bar in place diametrically.

The rear portion 18 of the device may be considered a handle for holding and manipulating the device, and may include handle guides 68 mounted on the tube in a suitable manner.

In the use of the device, the cocking rod 54 is manipulated manually by applying the thumb to the knob 60 and pushing the cocking rod 54 forwardly, toward the front end 16, to a forward cocked position shown in dot-dash lines at the left end of FIG. 1. A latch dog 69 is pivoted in mounting lugs 70 on the tube, and has an inner end 71 extending through an opening in the tube. Connected to the opposite end of the latch dog is a link 72, the other end of which is connected to a trigger 74 pivoted at 76 on the tube. A limit stop 78 is mounted in the lugs 70 for limiting swinging movement of the latch dog in clockwise direction. For convenience, the body 26 of the piston may have a notch 80 on a lower side for cooperation with the latch dog.

After the piston has been cocked, or moved to forward position, the latch dog moves into the notch 80, and holds the plunger in forward direction, through the action of the limit stop 78. The front end of the device is then held near the insect to be trapped, and the user actuates the trigger 74 which releases the latch dog from the piston, and the piston is then retracted rearwardly by the tension springs 38. The piston is moved rapidly, and through the sealing action of the gasket thereof with the tube, produces a partial vacuum in the tube, and specifically in the trap chamber 22 thereof. For convenience the partial vacuum will be referred to herein as a vacuum. This vacuum effects an inflow of air to the trap chamber through the front end which opens the flapper 30, and draws the insect in. Upon the piston reaching its rearmost or retracted position, the development of the vacuum ceases and the flapper 30 is moved downwardly to its closed position by the coil spring 34.

The insect is thereby trapped in the trap chamber 22, and may be disposed of in any convenient manner.

The device is particularly advantageous in capturing and trapping insects from crevices or openings or holes, where they are difficult to reach in any manner heretofore known. For example, a fly swatter will not reach an insect entirely in a crevice, and in the use of a fly swatter it would be necessary, for example, to chase the insect out of the crevice, and then annihilate it when it lands on an exposed surface.

Another great advantage is that the surface on which the insects land, such as walls and curtains, will not be smeared by killing flies thereon, such as by swatting, since the present device lifts the insects and draws them into the trap chamber in live condition.

I claim:

1. A bug catcher comprising, a tube having an open front end, a piston slidable in the tube, between a rear retracted position and a front cocked position, means for rapidly retracting the piston, the piston being operable, in response to being slid to retracted position, for developing a vaccum in the tube for drawing in a bug through the open front end, manually actuatable means for cocking the piston, connected to and movable with the piston, and extending through an elongated slot that runs substantially the length of a rear portion of the tube behind the piston retracted position and having a range of movement within the ends of the tube in the sliding movements of the piston, means for releasably holding the piston in its cocked position, and trigger means for manually releasing the piston.

2. A bug catcher comprising, a tube having an open front end and a trap chamber communicating therewith, means for producing a vacuum in the trap chamber including, a piston slidable in the tube between a forward cocked position and a rear retracted position, manually actuatable cocking means for moving the piston to the forward cocked position, means for releasably holding the piston in its forward cocked position, manually actuatable trigger means for releasing the holding means, means for moving the piston to a retracted position, the tube including a closure element adjacent to the front end thereof, movable to an open position in response to an inrush of air through the front end which in turn is produced in response to the development of a vacuum in the tube, and the bug is drawn into the trap chamber, the piston and the cocking means being removably mounted in the tube, and securing bars being demountably mounted in the tube, and operable for securing the piston and cocking means in the tube, and enabling movement thereof in their range of operation.

3. A bug catcher comprising, a tube having an open front end and a rear end, the tube forming a trap chamber therein in the front portion thereof communicating through the open front end to the exterior, a flapper pivoted in the tube adjacent the front end having a normal closed position and swingable inwardly to open position, spring means normally and yieldingly retaining the flapper in a closed position, a piston slideable in the trap chamber, the tube having a longitudinal slot in the rear portion thereof, a front bar detachably fitted in an operable position in the tube and movable through said slot into and out of said operable position, front tension springs interconnected between the piston and the front bar and operable for normally retaining the piston in a rearward retracted position, and the engagement of the front bar with the edge of the slot holding the bar against forward movement, a cocking rod having a main long segment and a short segment movable through said slot into and out of an operating position in which the long segment is in the tube and extended through the front bar, and the short segment extends through the slot to the exterior and the cocking rod being operable in response to its being moved forwardly manually for engaging the piston and moving it forwardly to a cocked position, a rear bar detachably secured to the tube, rear tension spring means interconnected between the cocking rod and rear rod, and operable for normally retaining the cocking rod in rearward retracted position, a latch dog operable for releasably retaining the piston in a forward cocked position, and manually actuatable trigger means for releasing the latch dog from the piston, whereby upon such release of the latch dog, the front tension spring means is operable for drawing the piston rearwardly, and the piston thereby produces a vacuum in the trap chamber and consequently an inrush of air into the trap chamber.

* * * * *